United States Patent [19]

Solomon et al.

[11] Patent Number: 5,599,130
[45] Date of Patent: Feb. 4, 1997

[54] UNIVERSAL BED RAIL MOUNT

[75] Inventors: Robert A. Solomon, Kalamazoo; David R. Postma, Grandville, both of Mich.

[73] Assignee: AM Fab, Inc., Grand Rapids, Mich.

[21] Appl. No.: 524,713

[22] Filed: Sep. 7, 1995

[51] Int. Cl.$^6$ .......................... A47C 19/22; F16B 12/32
[52] U.S. Cl. .................. 403/236; 5/282.1; 248/228.5; 248/536; 248/229.14; 403/400
[58] Field of Search ................. 5/282.1, 285, 425, 5/428, 429; 248/228.5, 229.14, 536, 539, 540; 403/236, 384, 386, 388, 400

[56] References Cited

U.S. PATENT DOCUMENTS

| | | | |
|---|---|---|---|
| 1,486,158 | 3/1924 | Price | 403/188 |
| 2,112,122 | 3/1938 | Sullivan | 5/505.1 |
| 2,130,546 | 9/1938 | Hovey | 403/384 X |
| 2,159,323 | 5/1939 | Erdos | 5/428 |
| 2,195,955 | 4/1940 | Hillenbrand | 248/231.85 |
| 2,379,446 | 7/1945 | Krueger | 182/178 |
| 2,496,645 | 2/1950 | Unwin | 403/400 X |
| 2,638,301 | 5/1953 | Smith | 248/229.15 |
| 2,648,850 | 8/1953 | Warren | 5/425 |
| 2,817,854 | 12/1957 | Pratt | 5/428 |
| 2,968,051 | 1/1961 | Imber et al. | 5/282.1 X |
| 2,973,176 | 2/1961 | Malafouris | 248/228.3 |
| 2,976,548 | 3/1961 | Maertins | 5/430 |
| 3,021,534 | 2/1962 | Hausted | 5/430 |
| 3,041,574 | 6/1962 | Cornell, Jr. | 403/400 X |
| 3,056,975 | 10/1962 | Murcott | 5/430 |
| 3,093,839 | 6/1963 | Higgins | 5/429 |
| 3,234,570 | 2/1966 | Hutt | 5/430 |
| 3,248,744 | 5/1966 | Hutt | 5/429 |
| 3,336,609 | 8/1967 | Taylor | 5/430 |
| 3,347,510 | 10/1967 | Buyken | 403/384 X |
| 3,351,961 | 11/1967 | Daniels et al. | 5/430 |
| 3,476,346 | 11/1969 | Oakes | 5/430 |
| 3,486,176 | 12/1969 | Murcott | 5/428 |
| 3,562,701 | 2/1971 | Orr | 403/236 X |
| 3,585,659 | 6/1971 | Burst et al. | 5/430 |
| 3,614,795 | 10/1971 | Agnew | 5/429 |
| 3,840,917 | 10/1974 | Taylor | 5/430 |
| 3,930,273 | 1/1976 | Stern | 5/430 |
| 3,932,903 | 1/1976 | Adams et al. | 5/100 |
| 3,971,083 | 7/1976 | Peterson | 5/430 |
| 4,676,687 | 6/1987 | Koffler | 403/386 |
| 4,724,559 | 2/1988 | Bly et al. | 5/425 |
| 5,038,430 | 8/1991 | Bly | 5/425 |

FOREIGN PATENT DOCUMENTS

| | | | |
|---|---|---|---|
| 319475 | 7/1934 | Italy | 403/400 |
| 682916 | 11/1952 | United Kingdom | 403/400 |
| 808818 | 2/1959 | United Kingdom | 403/388 |
| 1252924 | 11/1971 | United Kingdom . | |

*Primary Examiner*—Brian K. Green
*Assistant Examiner*—Andrea Chop
*Attorney, Agent, or Firm*—Varnum, Riddering, Schmidt & Howlett LLP

[57] ABSTRACT

A universal bed rail mount for securing bedside rail risers to a mattress supporting bed frame is disclosed. The mount comprises an L-shaped support for embracing the bed frame and is formed of two legs having an opening at an outer portion of each of the legs. The mount also includes at least one tension plate having a hole at a central portion thereof and having bearing surfaces at each of opposite ends of the plate. The bearing surfaces are adapted to be received in the openings in the outer portion of each of the legs. A bolt is received in the tension plate and is adapted to abut the bed frame embraced by the L-shaped support. An adjustable mechanical advantage element is on the bolt and on the tension plate to selectively adjust the position of the bolt in the hole in the tension plate and thereby adjust the tension between the L-shaped support and the tension plate with the bed frame therebetween. A riser guide support is affixed to an exterior surface of one of the legs.

10 Claims, 2 Drawing Sheets

UNIVERSAL BED RAIL MOUNT

BACKGROUND OF THE INVENTION

1. Field of the Invention

This invention relates to mounting clamps generally and, in particular, to a universal clamp for mounting a bed rail to a metal bed frame.

2. State of the Prior Art

Bed rail units have been in use on beds in hospitals and institutions to prevent the patient or bed occupant from accidentally rolling off or falling out of the bed. Many different attachment systems have been used to attach the bed rail units to the bed. These attachment systems have become complex since in deluxe beds, the top, bottom, and middle sections of the bed are adjustable to raise and lower the patient's head or feet. It is thus important that the bedside rail adjust according to the positions of the bed.

Typically, a bed to which a bed rail is to be attached has parallel bed frame member on each side of the bed extending from the foot to the head of the bed. Previous bed rail attachment systems have included the positioning of solid or telescoping cross braces over the bed frame members, the braces extending from bedside to bedside. These types of bed rail mounts are disclosed in U.S. Pat. Nos. 5,038,430 and 4,724,559 to Bly et al. and U.S. Pat. No. 3,021,534 to Hausted.

In U.S. Pat. No. 4,676,687 to Koffler, independent bedside rail clamps are used to mount bed rails to a bed frame. A base member is positioned over the bed frame member. A leg of the base member extends over the bed frame and is bent at approximately 45 degrees to the upper horizontal flange of the bed frame. A threaded bolt extends through the bent leg portion and bears against an interior corner of the bed frame member. As the bolt is tightened, the bed frame is clamped between the bolt and the base member, thereby securing the rail clamp to the bed frame. The bent leg of the base member is cantilevered from the base member, thereby leaving a free end of the leg to be displaced with respect to the base member which may result in potential movement of the bed rail clamps when lateral force is applied thereto.

In art areas other than the bed frame and bed rail arts, U.S. Pat. Nos. 1,486,158 to Price and 2,638,301 to Smith disclose general clamps capable of securement to a rod or other rigid member whereby a screw in the clamp is positioned at a 45 degree angle with respect to an interior angle formed by legs of the clamp frame, and the rigid member to which the clamp is to be attached is clamped between the screw and the interior angle formed by legs of the clamp.

SUMMARY OF THE INVENTION

According to the invention, a universal bed rail mount for mounting bed rails to a mattress-supporting metal bed frame comprises an L-shaped support for embracing the bed frame formed of two legs having at least one opening at an outer portion of each of the legs. The mount also includes at least one tension plate having a hole at a central portion thereof and having bearing surfaces at each of opposite ends of the plate. The bearing surfaces are adapted to be removably received in the openings in the outer portion of each of the legs. A bolt is received in the tension plate and is adapted to abut the bed frame embraced by the L-shaped support. An adjustable mechanical advantage element between the bolt and the tension plate selectively adjusts the position of the bolt in the hole in the tension plate and thereby adjusts the tension between the L-shaped support and the tension plate with the bed frame therebetween. A riser guide support is affixed to an exterior surface of one of the legs.

In the preferred embodiment the L-shaped support for embracing the bed frame has two openings at an outer portion of each of the legs and the tension plate has two bearing surfaces at each of opposite ends of the plate adapted to be removably received in the two openings in the outer portion of each of the legs. The L-shaped support has a top leg and a bottom leg, the top leg having indentations for clearance of springs attached to the bed frame. The outer portions of the top leg having the openings are bent downwardly.

Preferably, the mechanical advantage element is a threaded hole in the tension plate and threads on the bolt. Also, the bolt has wing tabs on a head for gripping by a person's finger to aid in tightening the bolt.

The riser guide support is a tube having a passage adapted for receiving a bedside rail riser. A lock for retaining the riser guide in fixed relationship with the mount is affixed to the riser guide support. The lock comprises a housing having one end affixed to the riser guide support which has a first hole therethrough in axial alignment with the housing and a second end terminating in a stop which has a second hole in axial alignment with the first hole and smaller than the first hole. A lock pin is located in the housing and has a first end adapted to be received by the first hole in the housing and a second end adapted to be received by the second hole in the housing. The locking pin has a shoulder at a point between its first and second ends, the second end of the pin protruding through the hole in the stop. A biasing spring is sleeved over the second end of the locking pin and is disposed between the locking pin shoulder and the housing stop. A knob is affixed to the second end of the locking pin.

BRIEF DESCRIPTION OF THE DRAWINGS

The invention will now be described with reference to the accompanying drawings in which.

DESCRIPTION OF THE PREFERRED EMBODIMENT

Figure 1:
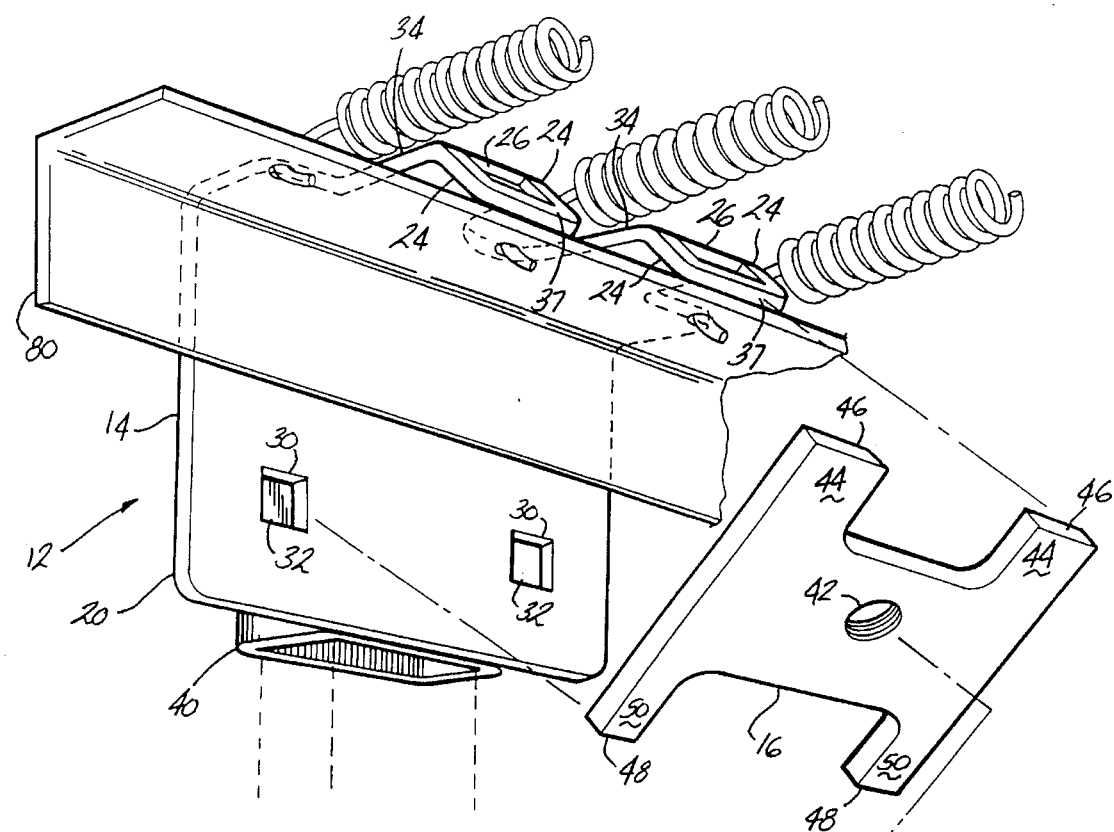
FIG. 1 is an exploded perspective view of a universal bed rail mount according to the invention showing the mount positioned on a metal bed frame.
Figure 2:
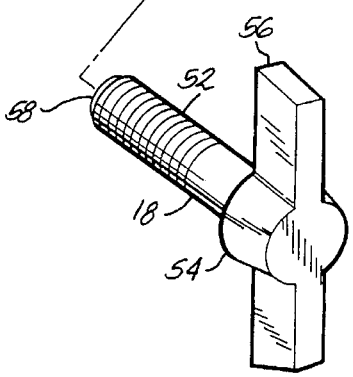
FIG. 2 is a top view of the bed rail mount shown in FIG. 1.
Figure 2:
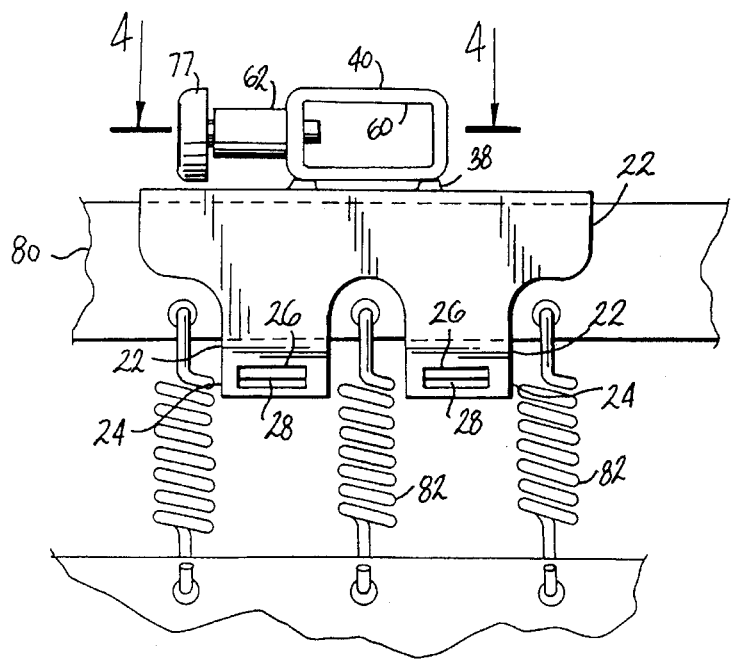

Referring now to the drawings, and to FIGS. 1 and 2 in particular, a universal bed rail mount 12 according to the invention comprises an L-shaped support 14, a bearing plate 16, and a clamping bolt 18. The components of the bed rail mount 12 are preferably formed from steel or other high strength material capable of withstanding high stress and bearing loads.

Figure 3:
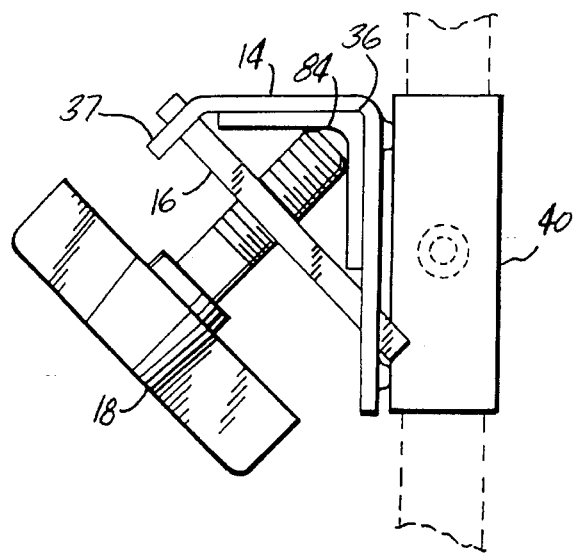
FIG. 3 is a side elevation view of the bed rail mount shown in FIGS. 1 and 2, showing the mount clamped to a metal bed frame.

L-shaped support 14 has a bottom vertical leg 20 and a top horizontal leg 22. Legs 20 and 22 are substantially orthogonal with respect to each other and form a support interior corner 36 as shown in FIG. 3. Two fingers 34 extend horizontally from leg 22, forming an indentation therebetween to clear springs 82 attached to the bed frame 80. The outer ends 37 at the end of each finger 34 extend downward from the fingers 34 at substantially a 45 degree angle. A rectangular opening 26 having a bearing surface 28 extends through each finger 34. The fingers 34 are sized and separated to fit between mattress support springs 82. The sizing of the legs 20 and 22 and the sizing and spacing of fingers 34 can be varied to accommodate various sized bed frame angles to which the mount 12 is to be attached. Two openings 30 having bearing surfaces 32 extend through vertical leg 20. Openings 30 are positioned at substantially an equal distance from interior corner 36 as openings 26 are located from interior corner 36. Each of openings 30 are substantially in vertical alignment with openings 26. While the disclosed preferred embodiment is described as having two fingers 34 and an equal number of corresponding openings 26 and 30, it is understood that a mount 12 according to the invention can be formed with any number of fingers 34 and corresponding openings 26 and 30.

Figure 4:
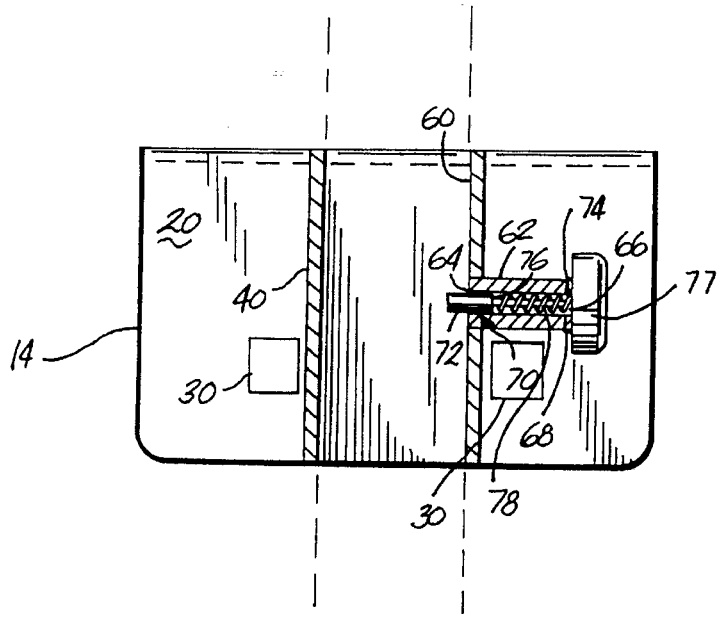
FIG. 4 is a side elevation view in section of the riser guide support and rail lock, taken along lines 4—4 of FIG. 2.

Referring to FIGS. 2 and 4, vertical leg 20 has an exterior surface 21 on which a number of weld tabs 38 are formed. Weld tabs 38 are located between openings 30. Riser guide support 40 is positioned on the weld tabs 38 and is welded to the exterior surface 21 in a manner such that its longitudinal axis is vertically oriented. Riser guide support 40 is a rectangular tube having a rectangular riser passage 60 for receiving the riser of a bed rail (not shown). A lock housing 62 is affixed to the riser guide support 40. One end of the lock housing 62 is affixed to the riser guide support 40 which has a first hole 64 in axial alignment with the housing 62 and a second end terminating in a stop 68 which has a second hole 66 in axial alignment with the first hole 64 and smaller than the first hole 64. A lock pin 70 is located in the housing 62 and has a first end 72 adapted to be received by the first hole 64 in the housing and a second end 74 of smaller diameter adapted to be received by the second hole 66 in the stop 68. The locking pin 70 has a shoulder 76 at a point between its first and second ends 72 and 74, the second end 74 of the pin 70 protruding through the hole 66 in the stop 68. A biasing spring 78 is sleeved over the second end 74 of the locking pin 70 and is disposed between the locking pin shoulder 76 and the housing stop 68. A knob 77 is affixed to the second end 74 of the locking pin 70.

Tension plate 16 is formed from a metal plate of sufficient thickness to withstand the clamping forces imparted on the plate when the mount 12 is positioned on a bed frame and is supporting a bed rail. Tension plate 16 is essentially formed in the shape of an 'H' having a threaded aperture 42 through the midpoint of plate 16. Threaded aperture 42 is sized and threaded to receive clamping bolt 18 as will be more fully described below. The upper legs of the 'H' form two upper engagement fingers 46, having bearing surfaces 44, and the lower legs of the 'H' form two lower engagement fingers 48 having lower bearing surfaces 50.

Clamping bolt 18 comprises a threaded hex bolt 52 with threaded end 58 and a molded cap 54. Threaded hex bolt 52 is a standard commercially available bolt with a hexagonal head. Cap 54 can be formed from plastic or other readily moldable materials which display rigid characteristics after molding and curing and is molded over the hexagonal head of bolt 52. Cap 54 has wing tabs 56 extending outward from cap 54 to provide surfaces for an operator to grasp with a hand or against which to apply pressure with fingers for rotating clamping bolt 18.

In operation, L-shaped support 14 is positioned on metal bed frame 80 so that the legs of frame 80 are positioned against the inner surfaces of legs 20 and 22. Fingers 34 are positioned between mattress springs 82. Lower engagement fingers 48 of tension plate 16 are inserted in openings 30, and upper engagement fingers 44 of tension plate 16 are inserted in openings 26. When tension plate 16 is so positioned with respect to riser guide support 14, bearing surfaces 28 and 44 are in contact with each other and bearing surfaces 32 and 50 are in contact with each other. Clamping bolt 18 is threaded into aperture 42 in tension plate 16. Rotational force is applied to cap 54 of clamping bolt 18 until bolt end 58 seats against interior corner 84 of bed frame 80. After seating in interior corner 84 as clamping bolt 18 continues to be rotated within threaded aperture 42 of tension plate 16, bed frame 80 is forced against support interior corner 36. When clamping bolt 18 is fully tightened against interior corner 84, bed frame 80 is clamped into a fixed immovable relationship with mount 12. Bed rail risers can then be inserted and locked into riser guide support 40 by applying a force to overcome the biasing spring 78 thereby withdrawing the second end 72 of lock pin 70 from passageway 60. When the riser is in place in riser guide support 40, the knob 77 is released, whereby biasing spring 78 forces first pin end 72 into a hole in the riser and locking the riser into a fixed relationship with mount 12.

While particular embodiments of the invention have been shown, it will be understood, of course, that in the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the present invention in which an exclusive property or privilege is claimed are defined as follows:

1. A universal bed rail mount for securing bedside rail risers to a mattress supporting bed frame comprising:

an L-shaped support for embracing the bed frame and formed of two legs, each leg having an inner surface facing the other leg and adapted to contact the bed frame, an exterior surface facing away from the other leg, and at least one opening at an outer portion of each leg and extending between the inner and exterior surfaces thereof;

at least one tension plate having a hole at a central portion thereof and bearing surfaces at each of opposite ends of the plate adapted to be received in the at least one opening in the outer portion of each of the legs and extending between the inner surfaces of the legs;

a bolt received in the tension plate and adapted to abut the bed frame when embraced by the L-shaped support;

an adjustable mechanical advantage element between the bolt and the tension plate to selectively adjust the tension between the L-shaped support and the tension plate with the bed frame therebetween; and a riser guide support affixed to the exterior surface of one of the legs.

2. The universal bed rail mount in accordance with claim 1 wherein:

the L-shaped support for embracing the bed frame has two openings at an outer portion of each of the legs; and the tension plate has two bearing surfaces at each of opposite ends of the plate adapted to be received in the two openings in the outer portion of each of the legs.

3. The universal bed rail mount in accordance with claim 1 wherein the L-shaped support has a vertical leg and a horizontal leg, the horizontal leg having indentations for clearance of springs attached to the bed frame.

4. The universal bed rail mount in accordance with claim 3 wherein the outer portion of the top horizontal leg having the at least one opening is bent downwardly.

5. The universal bed rail mount in accordance with claim 1 wherein the mechanical advantage element is a threaded hole in the tension plate and threads on the bolt.

6. The universal bed rail mount in accordance with claim 1 wherein the riser guide support is a tube having a passage adapted for receiving a bedside rail riser.

7. The universal bed rail mount in accordance with claim 1 wherein the bolt has wing tabs on a head of the bolt for finger actuation of the bolt.

8. A universal bed rail mount for securing bedside rail risers to a mattress supporting bed frame comprising:

an L-shaped support for embracing the bed frame and formed of two legs, each having two retainers at an outer portion thereof;

at least one tension plate having a hole at a central portion thereof and two bearing surfaces at each of opposite ends of the plate adapted to be received in the retainers in the outer portion of each of the legs;

a bolt received in the tension plate and adapted to abut the bed frame when embraced by the L-shaped support;

an adjustable mechanical advantage element between the bolt and the tension plate to selectively adjust the position of the bolt in the hole in the tension plate and thereby adjust the tension between the L-shaped support and the tension plate with the bed frame therebetween; and a riser guide support affixed to an exterior surface of one of the legs.

9. A universal bed rail mount for securing bedside rail risers to a mattress supporting bed frame comprising:

an L-shaped support for embracing the bed frame and formed of two legs, each having at least one retainer at an outer portion thereof;

at least one tension plate having a hole at a central portion thereof and bearing surfaces at each of opposite ends of the plate adapted to be received in the at least one retainer in the outer portion of each of the legs;

a bolt received in the tension plate and adapted to abut the bed frame embraced by the L-shaped support;

an adjustable mechanical advantage element between the bolt and the tension plate to selectively adjust the position of the bolt in the hole in the tension plate and thereby adjust the tension between the L-shaped support and the tension plate with the bed frame therebetween; and a riser guide support tube affixed to an exterior surface of one of the legs and having a passage adapted for receiving a bedside rail riser.

10. The universal bed rail mount in accordance with claim 9 wherein the riser guide support further comprises a lock for retaining a riser in fixed relationship with the mount.

\* \* \* \* \*